2,929,700

COMPOSITION AND METHOD OF CORRECTING NUTRIENT DEFICIENCY IN PLANTS

James P. Bennett, Lafayette, Calif.

No Drawing. Application September 2, 1955
Serial No. 532,375

15 Claims. (Cl. 71—1)

The present invention relates to a composition and method for correcting nutrient deficiency in plants, and especially to inhibiting or reducing chlorosis in plants suffering therefrom. More particularly, this invention relates to a composition comprising certain metal compounds in combination with salts of lignin sulfonic acids, which are the essential constituents of sulfite pulping spent liquor, to render the metal available for assimilation by plants, and to methods for supplying such available metals in a usable form to plants suffering from a deficiency of such metals as are necessary for healthy plant growth and normal development.

Nutrient deficiencies caused by the lack of such vital metal elements as iron, zinc, manganese, copper, molybdenum and the like is a condition which presents many serious problems in agriculture in this country and abroad. The condition manifests itself by reduced size of leaves, reduced stem growth, chlorophyll deficiency in leaves often resulting in chlorosis, and, if allowed to progress, eventually results in more or less stunted plants, loss of foliage and low yield. In extreme cases, partial or complete defoliation may occur, resulting in the ultimate death of the plant.

Under normal conditions, these vital nutrient elements are absorbed from the soil by the roots of the plant, then assimilated in their stems and leaves. However, varying soil conditions often limit the supply of such elements because they are present in the soil in an insufficient amount or in a non-absorbable form.

Iron chlorosis, namely chlorophyll deficiency, which is caused by a deficiency of iron, is wide spread over the western two-thirds of the United States, Florida and Hawaii. It occurs also in a number of European countries, and in Israel, Egypt, South Africa and Australia. Zinc deficiency is as fully wide spread as iron deficiency in the United States and is also known in many foreign countries.

Iron chlorosis is found on alkaline, usually calcareous, soils, where the condition is referred to as lime-induced chlorosis, as well as on neutral or acidic soil. Cases of iron chlorosis have been observed on numerous classes of plants such as fruit bearing trees, vegetables and annual crops. For example, in the State of California, in Santa Clara county there are about seven thousand acres of pear trees of which about seven hundred acres show light to severe iron chlorosis. There are many other areas in which, although recognizable chlorosis has not been found, a high percentage of the plants are on the verge of being chlorotic.

Iron deficiency in plants is recognized as being the most difficult of all nutritional deficiencies to correct. Spraying of chlorotic trees with low concentrations of common commercial forms of water soluble iron salts, such as iron sulfate, iron chloride or iron citrate, does not bring about uniform greening of the leaves, but instead causes formation of green spots thereon, while higher concentrations, although more effective, are very toxic.

Efforts to correct iron chlorosis by treating the plants with iron compounds in combination with currently known wetting and sticking agents used as carriers, at best, produce no more than a partial greening of the leaves because the iron in such combinations cannot be applied in sufficiently concentrated form without burning the foliage and fruit.

A more recent development is the application of the iron compounds in combination with chelating agents, the best known of which are ethylenediaminetetraacetic (EDTA) acid and its salts. Such compositions have met with some success under special conditions, but their efficiency is severely impaired by the fact that they are toxic to plants except in very dilute solutions containing less, in the case of iron, than about 0.03% of iron.

Dilute solutions are, of course, unsatisfactory because with them it is impossible to apply a sufficient quantity of the nutrient metal to give the plant any lasting benefit. This is so, because in spraying, which is the usual method of application, a leaf or fruit can only retain a limited quantity of moisture on its surfaces, any excess simply running off to waste. In other words, dilute solutions cannot be applied in sufficient quantity to furnish the necessary amount of required nutrient, while more concentrated compositions are unsatisfactory becauses their detrimental burning effect on the plants and fruit. Moreover, since burning of foliage and fruit occurs at higher concentrations with heretofore employed carriers, and it is desirable to apply the highest possible concentration in order to benefit the plant, a burden is placed on the spray operator to work within extremely close limits; that is, at the maximum concentration possible without burning of the plant.

The principal object of this invention, therefore, is the provision of ways and means for supplying available nutrient metals to plants deficient in such metals, in sufficient concentration to furnish the required amount of nutrient, but without detrimental effect on the plants or fruits, and, at the same time, to permit treating of such plants without constant vigilance and undesirable close control of solution concentration.

A further object is the provision of a new composition in which the nutrient element is rendered relatively non-toxic to plants, and by which nutrient deficiency in plants may be effectively treated.

Another object of the invention is to provide a novel composition for the treatment of chlorotic plants, which composition may be prepared in a simple manner and which is very low in cost.

Still another object is the provision of methods by which plants affected by chlorosis or other nutrient deficiency may be restored to a normal healthy condition.

The importance of this invention and the advantages afforded thereby will be more fully appreciated from the detailed description and claims which follow.

The term "corrective" is used here to denote various elements, such as iron, zinc, copper, manganese, molybdenum, and the like, which are supplied in available form to plants to correct a deficiency of one or more of such elements.

The correctives which may be employed in preparing compositions of this invention can be any organic or inorganic compounds that contain an available form of the metallic element in which the plant to be treated is deficient. In some cases, under various soil conditions, the plant may be lacking in more than one of the above mentioned elements. The metallic element or elements employed in the preparation of the compositions of this invention will, therefore, be determined by the conditions peculiar to the plant requiring the treatment. In each case, however, the composition comprises the constituents of sulfite pulping spent liquor which maintain the element in such a form that it will be readily and quickly assimilated by the plant.

Essential ingredients of the composition of this invention are the water soluble constituents of sulfite pulping spent liquor in combination with the corrective nutrient agent. Such combination produces a synergistic effect by yielding a composition in which the nutrient metal is in a readily absorbable form while, at the same time, the toxicity of the nutrient metal is greatly reduced. Thus, the composition of the invention enables the application of nutrient metals to plants in much greater and more beneficial concentrations than heretofore possible, yet without danger of burning the leaves or fruits. From all observations, it appears that the sulfite spent liquor constituents act as a complexing agent for the nutrient metal, and that some chemical or physical reaction occurs to reduce the toxicity of the nutrient element, thus minimizing the burning problem. Although the mechanism of the reaction between the constituents of sulfite spent liquor and any of the above mentioned metallic compounds is not clearly understood, it has been demonstrated that compounds of iron, copper, manganese and zinc are tied up by the constituents of sulfite spent liquor to form stable solutions under both acid and alkaline conditions.

The sulfuric spent liquor is normally obtained as a waste product from the pulping of wood or other lignocellulosic plants by calcium, ammonium, magnesium or sodium base cooking liquors. During the pulping process, wood chips, or other comminuted fibrous raw materials, are cooked under pressure with a liquor containing essentially calcium, ammonium, magnesium or sodium bisulfite, sulphur dioxide and water. This liquor dissolves the lignin to a greater or lesser degree as well as the sugars and other water soluble constituents originally present in the lignocellulosic raw material. The resulting spent liquor is then separated from the pulp. Although the composition of the liquor is somewhat variable depending upon the cooking conditions and the fibrous material used, its content of lignin sulfonates ranges generally between about 40% and about 70% by weight (dry basis), while the amount of sugars may range from about 10% to about 40% by weight on a dry basis.

A typical liquor resulting from the pulping of western hemlock by ammonium base sulfite process contains about 11% solids having the composition shown in Table I wherein the miscellaneous constituents comprise wood extractives, waxes, fatty acids, sterols and the like. The composition shown in Table I comprises essentially ammonium lignin sulfonate.

TABLE I

| | Total solids. percentage by weight |
|---|---|
| Ammonium lignin sulfonates | 58 |
| Reducing sugars as glucose | 17 |
| Miscellaneous | 25 |

A product of this type is an ammonium base sulfite spent liquor produced and sold by Crown Zellerbach Corporation under the trademark "Orzan" in liquid form in a wide range of concentrations, as well as in the form of a dry powder. Sulfite spent liquors having other bases, such as calcium, magnesium or sodium, and composed principally of the lignin sulfonate salts of such metals, are equally suitable for carrying out the objects of this invention.

Although sulfite spent liquor is usually acidic in character, it may be neutralized with an alkali, such as sodium hydroxide, or alkalified to a pH value higher than 7.0. Such neutralized or alkalified liquor is suitable for use in this invention, as are liquors from which the sugars have been completely or partially removed by any of the usual methods, such as by the well-known fermentation with *Torula utilis* described in the magazine, Paper Trade Journal, volume 133, No. 10, pages 96, and 98–100 (1951). Although the pH of the compositions applied to the plants may vary over a wide range, it is preferred to maintain a pH of 5–6 which approximates that of most plant tissues. Moreover, if the solution is to acidic or too alkaline, it may corrode equipment.

Water soluble metal compounds are preferably used in accordance with this invention. However, water insoluble or partly water insoluble metal compounds can be employed provided they are solubilized prior to application to the plants. Examples of compounds furnishing iron are iron chloride, iron sulfate, iron carbonate, iron citrate and the like. Compounds furnishing other metal elements are copper sulfate, manganese sulfate, zinc sulfate, molybdenum trioxide and the like. Double salts furnishing two of the elements, such as ferric-zinc chlorides or sulfates, can also be used.

The compositions of the present invention may be prepared in any desired form such as a dry powder, a solution or a suspension in a liquid medium, preferably water. In making up a dry composition, the nutrient corrective, for example a metal salt, is mixed thoroughly with powdered constituents of sulfite spent liquor in conventional mixing equipment, such as an attrition mill or the like. Liquid compositions may be conveniently prepared by dissolving or suspending the dry composition in water or other suitable liquid, or simply by mixing the metal compound in a liquid sulfite spent liquor of any desired solids content to form a solution which may be used or dried to yield a powder of the complex.

The relative amounts of the nutrient element and of the compound furnishing the corrective element and of the constituents of the sulfite spent liquor may vary within a wide range. In practical application, however, the preferred ratio on the basis of the nutrient metal element to dry solids content of sulfite liquor, should be in the range from 1 to 15 up to 1 to 25 parts by weight, respectively although this ratio is not critical and may extend from 1 to 1 up to 1 to 100 parts by weight.

The concentration of the nutrient element in the liquid spray composition may vary over a wide range. Generally, a solution or suspension containing 0.01% by weight of corrective element, or even less, up to a concentration of about 1.0% by weight of corrective element will be satisfactory for foliage spray applications. In the case of iron, the preferred concentration is in the range from 0.05% to 0.25% by weight which is greater than has been heretofore possible to apply to plants without burning. It is not required that the composition be applied by spraying alone, as it is within the scope of the invention to apply it in wet or dry form to the soil in which the plant is growing, to dust it on the plant, or to inject it directly into the plant itself. In the latter two cases it will be preferable to use the dried complex such as will be yielded when the metal salt is mixed with the spent sulfite liquor and the resutling mixture dried.

The toxicity reducing effect of the sulfite spent liquor on iron is demonstrated by results from an actual comparative test in which a solution of ferrous sulfate alone was sprayed on iron-deficient, chlorotic Hardy pear trees. A freshly prepared solution of ferrous sulfate containing 0.15% iron by weight was sprayed directly on one chlorotic tree and resulted in severe burning of many leaves with actual tissue destruction in the leaves. A non-toxic solution was then prepared by adding to the original ferrous sulfate solution enough of the above mentioned "Orzan" (ammonium base spent sulfite liquor) to give a dry weight ratio of one part iron to twenty parts "Orzan." When sprayed on the foliage of a chlorotic Hardy pear tree showing the same chlorosis symptoms as the one sprayed with the ferrous sulfate alone, it resulted in a marked improvement in the greening of the tree and there was no burning of the foliage.

This toxicity reducing effect was further demonstrated by actual tests in which chlorotic mature pear trees (Hardy variety) were separately sprayed with several commercial iron-bearing chelating agent solutions and the trees compared with similar trees sprayed with a spray composition prepared in accordance with this invention. In the tests, a basic mixture of approximately one part elemental iron (dry weight) to twenty parts of the above mentioned "Orzan" (dry weight) was employed. This basic mixture was used to prepare aqueous spray solutions of varying iron concentrations. This composition is hereinafter referred to as iron-"Orzan." Commercial preparations used in the tests included "Chel 330," an iron-bearing compound, known also as "Iron Sequestrene," containing about 10.5% elemental iron and soluble in water to form spray solutions of desired iron concentration. This compound, hereinafter referred to as Comm. I., is manufactured and sold by the Geigy Corporation. A second commercial preparation, hereinafter referred to as Comm. II, manufactured and sold by the Geigy Corporation, is known as EDTA (also known as an "Iron Sequestrene") contains about 12% iron and can be dissolved in water to yield a spray solution of any desired strength. The third commercial preparation used, hereinafter referred to as Comm. III, was a compound containing about 8% iron, manufactured and sold by the Bersworth Co. as "Ferrogreen." Like the other compounds, it can be dissolved in water to give a spray solution of desired strength.

Solutions were prepared and sprayed on the chlorotic pear trees, each tree receiving about three gallons of spray.

In all cases where the elemental iron concentration was as high as .03% by weight, each of the above commercial preparations (I, II and III), burned the foliage, and often the fruit, of the treated trees.

The above iron-"Orzan" mixture was put in aqueous solution and applied to similar trees at elemental iron concentrations (dry weight basis) ranging up to 0.2%, an almost sevenfold concentration increase over that of the commercial preparations, yet there was no burning of either fruit or foliage.

It will be understood by those skilled in the art that the amount of the corrective agent to be supplied to the chlorotic plant in the form of a composition of this invention to correct or inhibit nutrient deficiencies will vary depending on the type of plant affected and on the degree of the deficiency of the nutrient element. Usually, visual observation of the change in color of the foliage back to a healthy green as well as the general appearance of the treated plant will be sufficient to determine the effect of the corrective composition after the first application, and enable one to determine whether further application is required. Analysis of leaves for their content of the deficient element or elements before and after treatment of the plant may also be helpful in determining whether further application of the composition is needed.

The following examples illustrate, but in no way limit the compositions of this invention and the methods of treating chlorotic plants by means of such compositions. All the amounts expressed in the examples are in parts by weight of dry solids.

*Example I*

| | Parts |
|---|---|
| Ferric chloride ($FeCl_3 \cdot 6H_2O$) | 4.8 |
| Sulfite spent liquor (dry solids) | 17.0 |

The sulfite spent liquor was ammonium-base sulfite spent liquor in form of a dry powder, supplied by the Crown Zellerbach Corporation, San Francisco, California, under the trademark Orzan. Both components were mixed thoroughly in a conventional attrition mill until a uniform mixture was obtained. The solid composition thus produced may be employed in any convenient manner, such as in its powdered form for applications to the soil, by being dissolved in an aqueous medium to form a solution of a desired iron concentration for application as a spray, or by being formed into pellets by well known procedures.

*Example II*

| | Parts |
|---|---|
| Cupric sulfate ($CuSO_4 \cdot 5H_2O$) | 3.9 |
| Sulfite spent liquor (dry solids) | 18.0 |

The sulfite spent liquor and the method of preparation were the same as in Example I. The resulting composition may be used in any convenient form for treatment of copper deficiency.

*Example III*

| | Parts |
|---|---|
| Zinc sulfate ($ZnSO_4 \cdot H_2O$) | 2.8 |
| Sulfite spent liquor (dry solids) | 14.0 |

The sulfite spent liquor and the method of preparation were the same as in Example I. The resulting composition may be used in any convenient form for treatment of zinc deficiency.

*Example IV*

| | Parts |
|---|---|
| Manganous sulfate ($MnSO_4 \cdot 4H_2O$) | 4.1 |
| Sulfite spent liquor (dry solids) | 15.0 |

The sulfite spent liquor and the method of preparation were the same as in Example I. The resulting composition may be used in any convenient form for treatment of manganese deficiency.

*Example V*

| | Parts |
|---|---|
| Molybdenum trioxide ($MoO_3$) | 1.5 |
| Sulfite spent liquor (dry solids) | 20.0 |

The sulfite spent liquor and the method of preparation were the same as in Example I. The resulting composition may be used in any convenient form for treatment of molybdenum deficiency.

*Example VI*

| | Parts |
|---|---|
| Ferric chloride, anhydrous ($FeCl_3$) | 1.4 |
| Zinc sulfate ($ZnSO_4 \cdot H_2O$) | 1.4 |
| Sulfite spent liquor (dry solids) | 20.0 |

The sulfite spent liquor and the method of preparation were the same as in Example I. The resulting composition may be used in any convenient form for treatment of iron and zinc deficiency.

*Example VII*

| | Parts |
|---|---|
| Ferrous sulfate ($FeSO_4 \cdot 7H_2O$) | 5.0 |
| Desugared sulfite spent liquor (dry solids) | 20.0 |

The sufite spent liquor, in form of a 50% concentrate, was partly desugared by fermentation with *Torula utilis* from its original sugar content of about 18.0%, calculated as glucose, to a sugar content of about 3.1%. The composition was prepared by mixing both components with stirring until a homogeneous mixture was obtained. The resulting composition may be used in any convenient form for treatment of iron deficiency.

*Example VIII*

The composition described in Example I for correcting iron deficiency was dissolved in 2000 parts by weight of water to give a solution containing 0.05% iron element by weight. The spray was applied to mature, fruit bearing chlorotic pear trees of the Bartlett and Hardy varieties at a rate of about four hundred gallons per acre of trees, each acre containing approximately 100 trees.

Before treatment the trees were 50% to 90% chlorotic, that is, they showed chlorotic symptoms, such as yellowing leaves, over 50% to 90% of their foliage. Three weeks after spraying, the chlorosis was markedly reduced with the trees being from 70%–80% healthy green. No burning of either leaves or fruit occurred even though the solution contained 0.05% iron and burning usually occurred from previously employed iron-bearing sprays when the iron content exceeded about 0.03%.

*Example IX*

Compositions were prepared from the iron salts indicated below to give a ratio of 1 part iron element to 20 parts of the aforementioned "Orzan," and the resulting mixture used to prepare solutions of varying iron concentrations which were sprayed on chlorotic peach trees of the Hale, Paloro, Gold Dust and Rio Oso varieties ranging in age from 2 to 10 years. The treated trees were compared with untreated chlorotic peach trees of the same varieties used as controls.

The results are shown in the table below in which the control period, column 4, is the length of time during which the trees were observed following the spraying. In test A, the iron was added as ferric chloride (FeCl$_3$·6H$_2$O) while in the remainder of the tests, ferrous sulfate (FeSO$_4$·7H$_2$O) was used.

| | 1 | 2 Iron Concentration, Percent by Weight | 3 Gals. Per Tree | 4 Control Period, Days | 5 Percent of green in leaf area at end of control period |
|---|---|---|---|---|---|
| Test A: Hale Var | Sprayed tree | 0.05 | 1.0 | 36 | 50. |
| | Control tree | | | 36 | 5–10. |
| Test B: Hale Var | Sprayed tree | 0.1 | 1.0 | 36 | 75. |
| | Control tree | | | 36 | 5–10. |
| Test C: Paloro Var | Sprayed tree | 0.03 | 2.0 | 50 | 60. |
| | do | 0.03 | 2.0 | 36 | 60. |
| | Control tree | | | 50 | under 5. |
| Test D: Gold Dust Var | Sprayed tree | 0.05 | 0.3 | 47 | 50–60. |
| | Control tree | | | 47 | 5. |
| Test E: Rio Oso Var | Sprayed tree | 0.05 | 1.0 | 34 | 50. |
| | do | 0.10 | 1.0 | 34 | 60. |
| | do | 0.15 | 1.0 | 34 | 80. |
| | do | 0.20 | 1.0 | 34 | 70. |
| | Control tree | | | 34 | under 5. |

No burning of leaves or fruit occurred in any of the tests.

The severity of chlorosis is visually determined by the percentage of green area in the foliage. Thus, column 5 clearly shows the beneficial effect of treatment in accordance with the invention. The data also emphasizes the importance of higher concentrations of iron in the solution. Note, for instance, from columns 2, 3 and 5, that increases in iron concentration in the solution resulted in increased green area on the treated leaves. Test C indicates that the more dilute solutions require a greater volume of spray for a comparable effect. The 0.05% iron solutions, used in tests A, D and part of E, indicate that the solution has a lasting effect and that the greening, which indicates the degree of improvement, generally increases with the passage of time.

*Example X*

A spray solution was prepared using one part iron element, as ferric chloride, to 20 parts of the abovementioned "Orzan" and dissolving the mixture in water to give an iron concentration of 0.04 percent.

A comparative test was conducted by spraying approximately two gallons of the solution on a portion of one very yellow chlorotic prune tree, the remainder of the tree being left unsprayed. Six weeks after spraying, the treated portion of the tree was much improved, showing a great deal more green than the untreated leaves. Almost all leaves of the treated portion remained on the tree. The unsprayed leaves were very yellow, some were dead and many had fallen from the tree. Unsprayed control trees in the same group were in the same condition as the unsprayed portion of the treated tree. In other words, the nutrient element was not distributed from sprayed leaves to unsprayed leaves. This clearly demonstrates the need for full coverage of all leaves with a sufficient concentration of iron in order to benefit the plant.

I claim:

1. A process for treating growing-in-soil plants deficient in at least one nutrient metal selected from the group consisting of iron, zinc, copper, manganese and molybdenum, which comprises applying to the plant a mixture consisting essentially of: (a) at least one of said deficient nutrient metals in readily available form, and (b) as a toxicity reducing agent for such nutrient metal the constituents of sulfite pulping spent liquor.

2. The process of claim 1 in which said mixture is applied to the plant in an aqueous vehicle, and the amount of the nutrient metal in said vehicle is in the range of from about 0.01% to 1% by weight.

3. The process of claim 2 in which the nutrient metal is iron for the treatment of iron chlorosis in plants, and the amount of iron in said aqueous vehicle is in the range of from about 0.05% to 0.25% by weight.

4. The process of claim 2 in which said mixture-containing aqueous vehicle is sprayed onto the plant.

5. The process of claim 1 in which said mixture is supplied to the soil in which the plant is growing.

6. The process of reducing the toxicity of absorbable nutrient metal to plants, which comprises mixing (a) a water-soluble compound of a nutrient metal selected from the group consisting of iron, zinc, copper, manganese and molybdenum with (b) the constituents of sulfite pulping spent liquor, and controlling the ratio of the amount of said metal to said constituents to be in the range from 1:1 to 1:100, respectively, dry weight basis.

7. The process of claim 6 in which the water-soluble compound of a nutrient metal is an iron salt.

8. A composition for the treatment of iron chlorosis in plants consisting of: (a) an aqueous solution of an iron salt and (b) as a toxicity reducing agent for said iron salt the constituents of sulfite pulping spent liquor, the concentration by weight of the iron in said solution being in the range from 0.05% to 0.25%.

9. A composition for the treatment of plants deficient in at least one nutrient metal selected from the group consisting of iron, zinc, copper, manganese and molybdenum, consisting of the following active ingredients: (a) at least one of such deficient nutrient metals in available form to said plants, and (b) the constituents of sulfite pulping spent liquor; said nutrient metal being present in said composition in an amount sufficient to supply said plant deficiency of said nutrient metal and said constituents being present in an amount sufficient to reduce toxicity of said nutrient metal to said plants; the ratio of the amount of the metal to said constituents being in the range of from 1:1 to 1:100, respectively, dry weight basis.

10. The composition of claim 9 wherein said nutrient metal is in the form of a water-soluble compound.

11. A liquid composition for the treatment of plants deficient in at least one nutrient metal selected from the group consisting of iron, zinc, copper, manganese and molybdenum, consisting of the following active ingredients in an aqueous liquid: (a) at least one of such deficient nutrient metals in available form to said plants, and (b) the constituents of sulfite pulping spent liquor; said nutrient metal being present in said composition in an amount sufficient to supply said plant deficiency of said nutrient metal and said constituents being present in an amount sufficient to reduce toxicity of said nutrient metal to said plants; the concentration of the nutrient metal in the liquid composition being from 0.01% to 1.0% by weight.

12. The composition of claim 9 wherein the ratio of the amount of the metal to said constituents is in the range from 1:15 to 1:25, respectively, dry weight basis.

13. The process of claim 6 in which the water-soluble compound of a nutrient metal is a zinc salt.

14. The composition of claim 9 wherein the nutrient metal is in the form of a water-soluble iron salt.

15. The composition of claim 9 wherein the nutrient metal is in the form of a water-soluble zinc salt.

References Cited in the file of this patent

UNITED STATES PATENTS

| | | |
|---|---|---|
| 1,144,905 | Kern | June 29, 1915 |
| 1,283,677 | Connor | Nov. 5, 1918 |
| 2,117,087 | Formhals | May 10, 1938 |
| 2,218,695 | Leatherman | Oct. 22, 1940 |
| 2,574,027 | Farber | Nov. 6, 1951 |
| 2,663,628 | Thomsen | Dec. 22, 1953 |
| 2,735,756 | Farber | Feb. 21, 1956 |
| 2,772,151 | Nikitin | Nov. 27, 1956 |
| 2,794,299 | Thomas | June 4, 1957 |
| 2,860,448 | Carasso | Nov. 18, 1958 |